(12) United States Patent
Burns

(10) Patent No.: US 7,661,255 B2
(45) Date of Patent: Feb. 16, 2010

(54) LAWN EQUIPMENT MINIMAL TRACK WHEEL

(76) Inventor: William Randall Burns, 15632 SE. Fairwood Blvd., Renton, WA (US) 98058

(*) Notice: Subject to any disclaimer, the term of this patent is extended or adjusted under 35 U.S.C. 154(b) by 21 days.

(21) Appl. No.: 11/150,519

(22) Filed: Jun. 9, 2005

(65) Prior Publication Data

US 2005/0274099 A1    Dec. 15, 2005

Related U.S. Application Data

(60) Provisional application No. 60/578,752, filed on Jun. 10, 2004.

(51) Int. Cl.
*A01D 34/00* (2006.01)
*A47B 91/00* (2006.01)
*A63C 17/22* (2006.01)

(52) U.S. Cl. .................. 56/16.7; 16/45; 301/5.301

(58) Field of Classification Search .................. 301/5.1, 301/5.301, 5.305, 5.309, 7, 86, 35.53, 35.54, 301/36.1, 35.61, 64.301–64.303, 64.701, 301/64.707; 56/16.7; 16/18 R, 45, 47
See application file for complete search history.

(56) References Cited

U.S. PATENT DOCUMENTS

| | | | | |
|---|---|---|---|---|
| 261,638 A | 7/1882 | Stanly | | |
| 285,491 A * | 9/1883 | Keller | | 16/47 |
| 653,316 A * | 7/1900 | Russell | | 16/45 |
| 698,110 A * | 4/1902 | Foy | | 301/5.301 |
| 742,836 A * | 11/1903 | Carroll | | 16/45 |
| 759,299 A * | 5/1904 | Myers | | 16/45 |
| 977,056 A | 11/1910 | Verplanck | | |
| 2,474,939 A | 7/1949 | Halford | | 301/47 |
| 2,730,856 A | 1/1956 | Mekalainas | | 56/249 |
| 4,589,252 A | 5/1986 | Williams | | 56/255 |
| 5,007,234 A * | 4/1991 | Shurman et al. | | 56/16.7 |
| 5,209,050 A * | 5/1993 | Carrigan | | 56/16.7 |
| 5,528,891 A | 6/1996 | Wzietek | | 56/16.7 |
| 5,870,888 A | 2/1999 | Pugh | | 56/16.7 |
| 5,906,090 A | 5/1999 | Knudsen | | 56/16.7 |
| 5,960,615 A * | 10/1999 | Meetze | | 56/16.7 |
| 6,398,232 B1 * | 6/2002 | Dahan | | 301/5.301 |

* cited by examiner

*Primary Examiner*—Jason R Bellinger
(74) *Attorney, Agent, or Firm*—Dean A. Craine

(57) ABSTRACT

A wheel for a piece of lawn equipment specifically designed not to produce tracks in the lawn as the lawn equipment moves over the lawn. The wheel is made of two parallel circular discs spaced apart by a center spacer. The two discs are relatively thin and thereby have minimal contact with the grass blades when rolling over the lawn. The height of the wheel and the diameter of the axle are sufficient so that glass blades on the lawn are not bent downward and extend upward between the two discs. An optional ring structure made of rubber or similar material is attached over the perimeter edge of each disc to provide greater traction and to protect the edge from damage. Located inside the wheel axle is an optional bushing or wheel bearing.

3 Claims, 14 Drawing Sheets

PRIOR ART

LAWN EQUIPMENT MINIMAL TRACK WHEEL

FIELD OF THE INVENTION

This utility patent application is based on the provisional patent application (Ser. No. 60/578,752) filed on Jun. 10, 2004.

BACKGROUND OF THE INVENTION

Description of the Related Art

Lawn mowers typically have one or two pairs of wheels mounted on the opposite sides of the mower's housing that hold the housing a desired distance above the lawn. The wheels are typically mounted on adjustable brackets that allow the height of the lawn mower housing to be adjusted. During use, the wheels on the housing creates tracks in the lawn as shown in FIG. 1.

Recently, it has become popular to attach a roller behind the housing that bends the grass downward as the mower travels over the lawn. By moving the mower in different directions, decorative patterns may be created in the lawn. Such patterns are commonly seen on the infield and outfield areas on a baseball field.

While most homeowners take pride in having well groomed lawns, some homeowners find intentional or unintentional patterns in their lawns excessive and in vain. The main object of the invention disclosed herein is to provide lawn equipment that does not produce tracks in the lawn.

SUMMARY OF THE INVENTION

The above object is met by a wheel for a piece of lawn equipment specifically designed not to produce tracks in the lawn as the lawn equipment moves over the lawn. The wheel is made of two parallel circular discs spaced apart by a center spacer. The two discs are relatively thin and have minimal contact with the individual grass blades thereby not producing tracks in the lawn. The center spacer is hour-glass shape with a narrow center region that allows the grass blades to extend upward between the two discs. In three embodiments of the invention, the two discs and the center spacer are separate structures connected together by a plurality of bolts and nuts. In a fourth embodiment, the two discs and center spacer are integrally formed on one structure. With each embodiment, an optional traction ring made of rubber or similar material may be attached the perimeter edge of each disc to provide greater traction.

DESCRIPTION OF THE PREFERRED EMBODIMENT(S)

Figure 1:
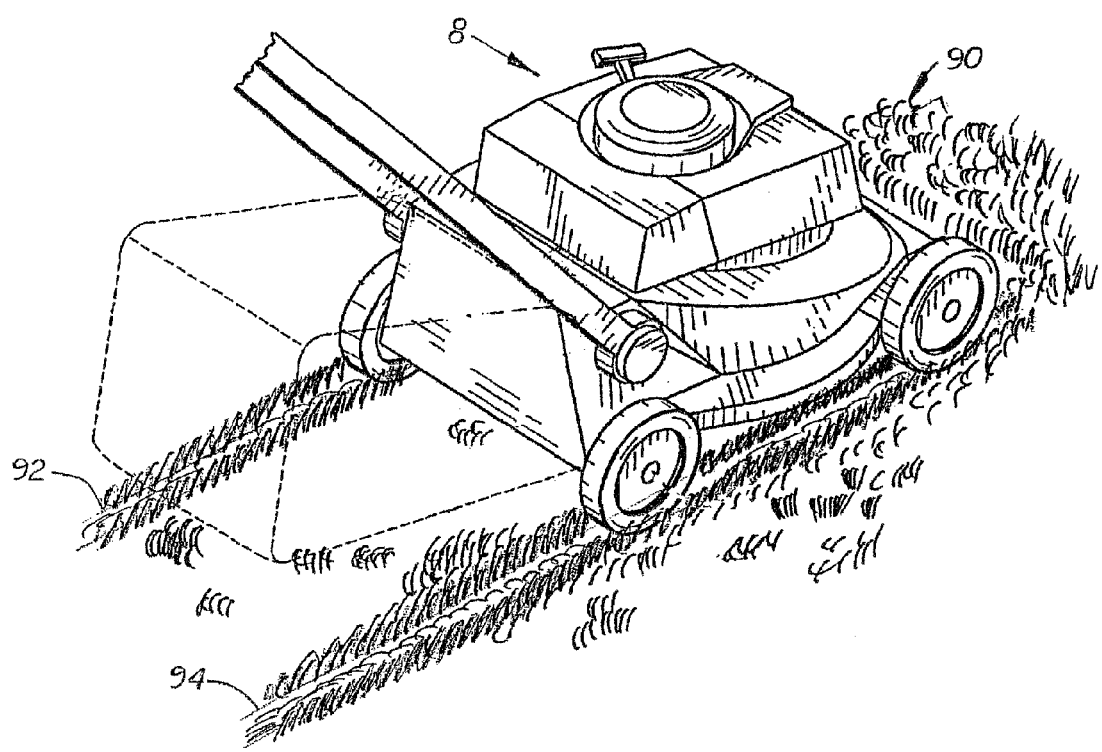
FIG. 1 is a perspective view of a lawn mower found in the prior art with two sets of wheels that leave tracks in the lawn when the lawn mower moves across the lawn.
Figure 2:
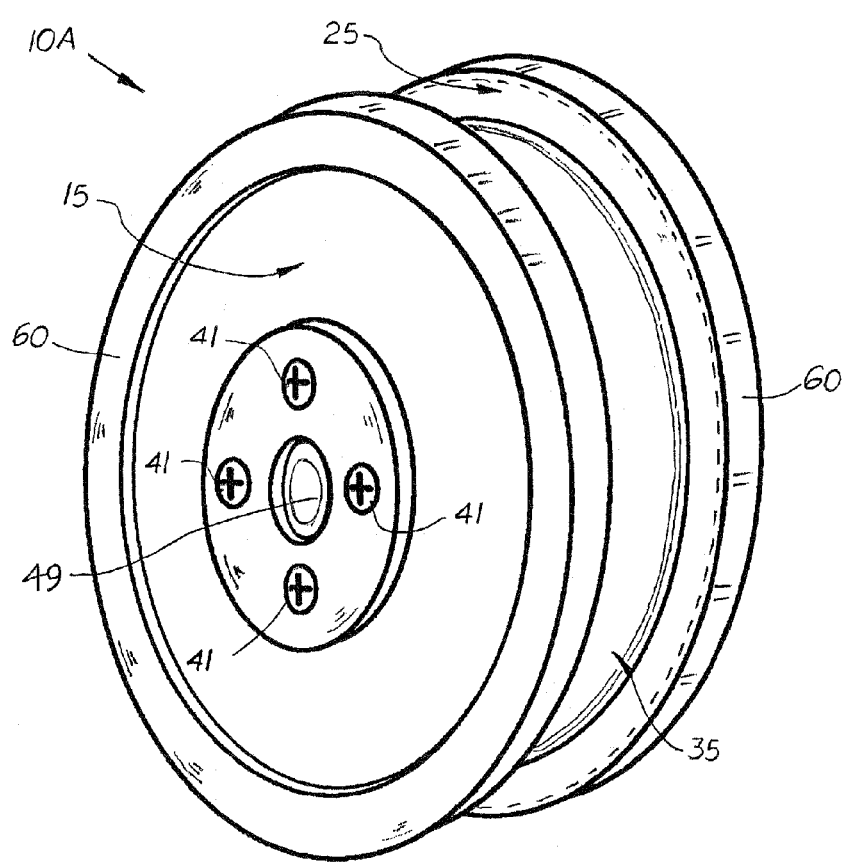
FIG. 2 is a perspective view of a lawnmower wheel described herein designed not to leave visual tracks in the lawn.
Figure 10:
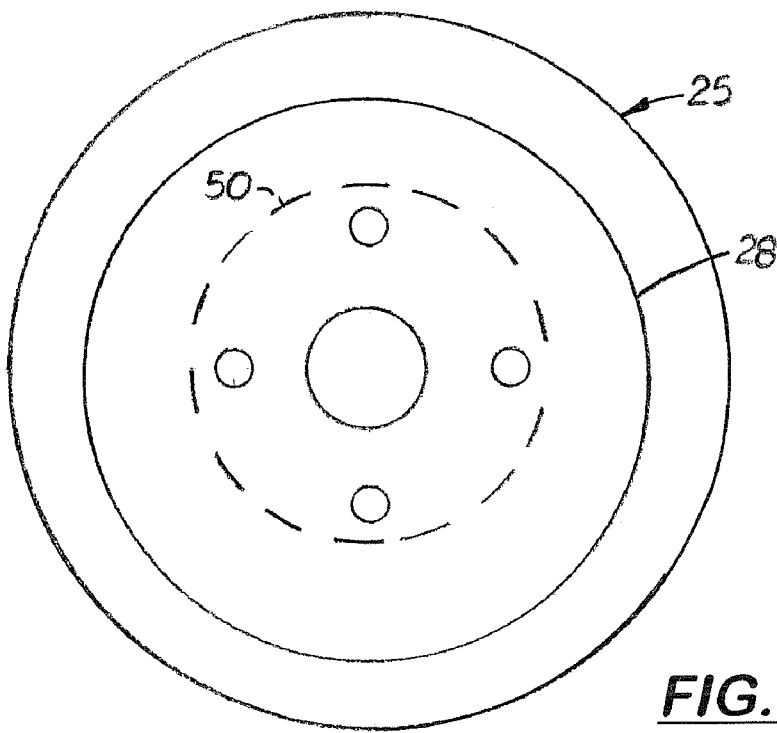
FIG. 10 is a front plan view of the inner disc used on the wheel shown in FIG. 8.
Figure 11:
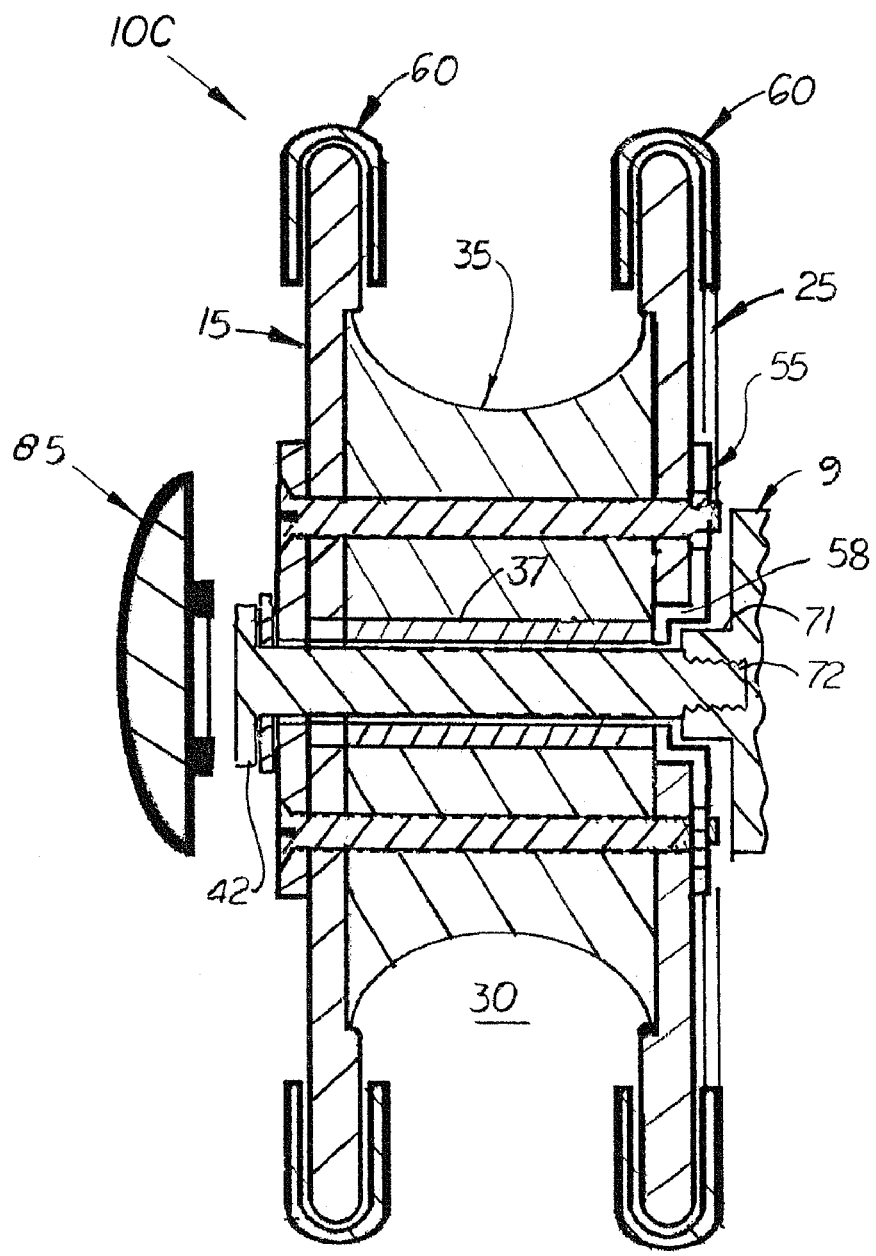
FIG. 11 is a right side elevational view of a third embodiment of the wheel.
Figure 12:
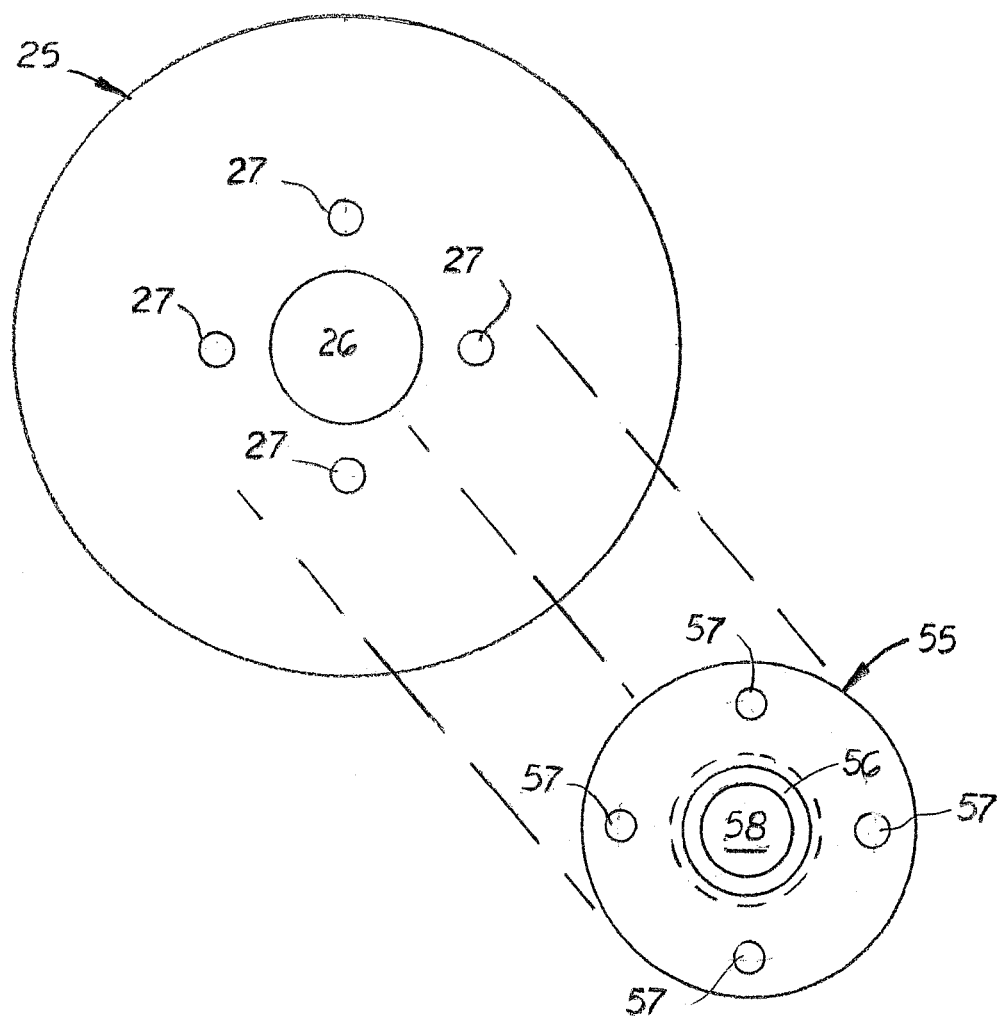
FIG. 12 is a rear plan view of the inner wheel used on the wheel shown in FIG. 11.
Figure 15:
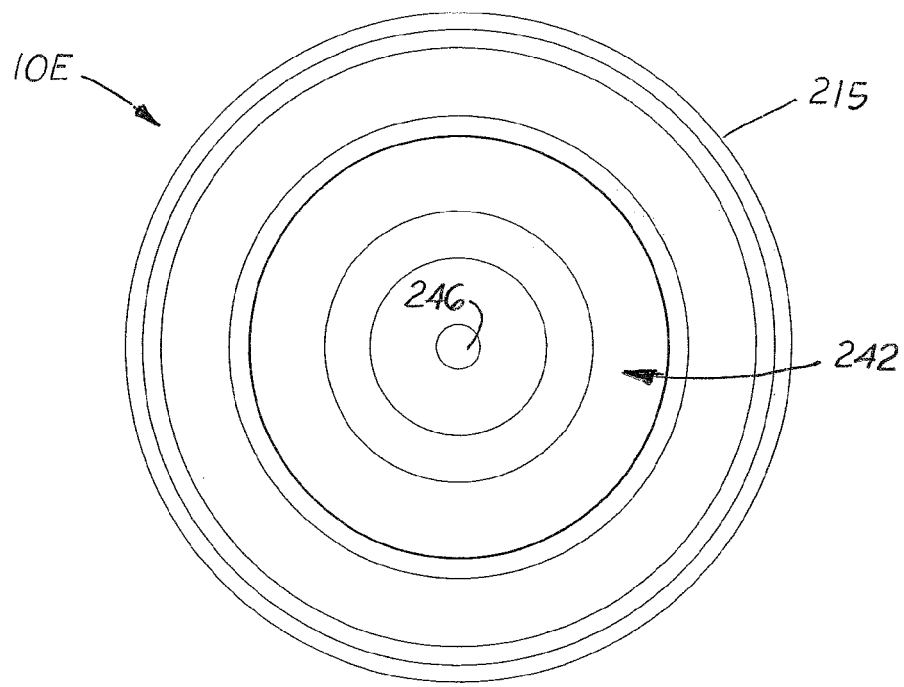
FIG. 15 is a front plan view of a fifth embodiment of the wheel.
Figure 16:
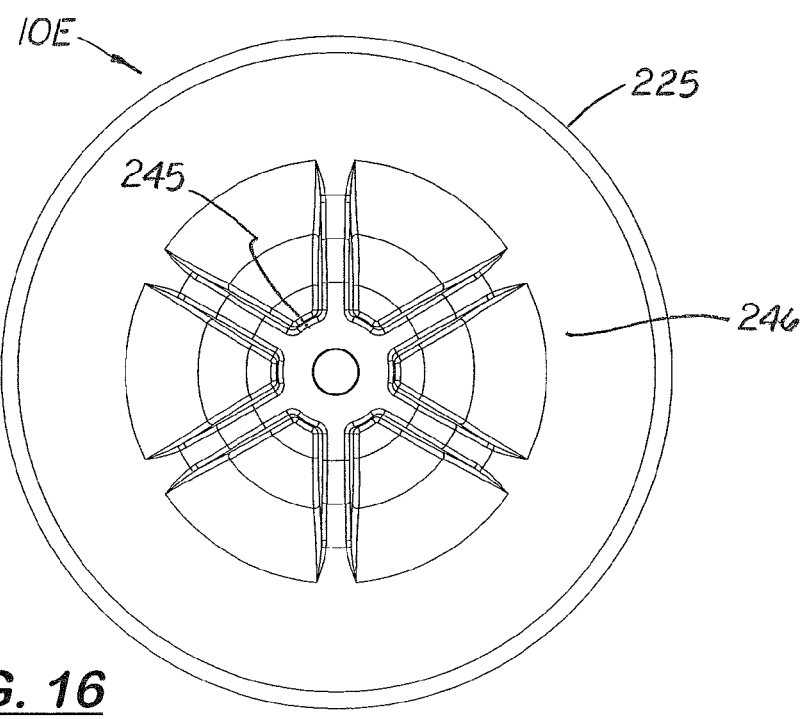
FIG. 16 is a rear plan view of the wheel shown in FIG. 15.
Figure 17:
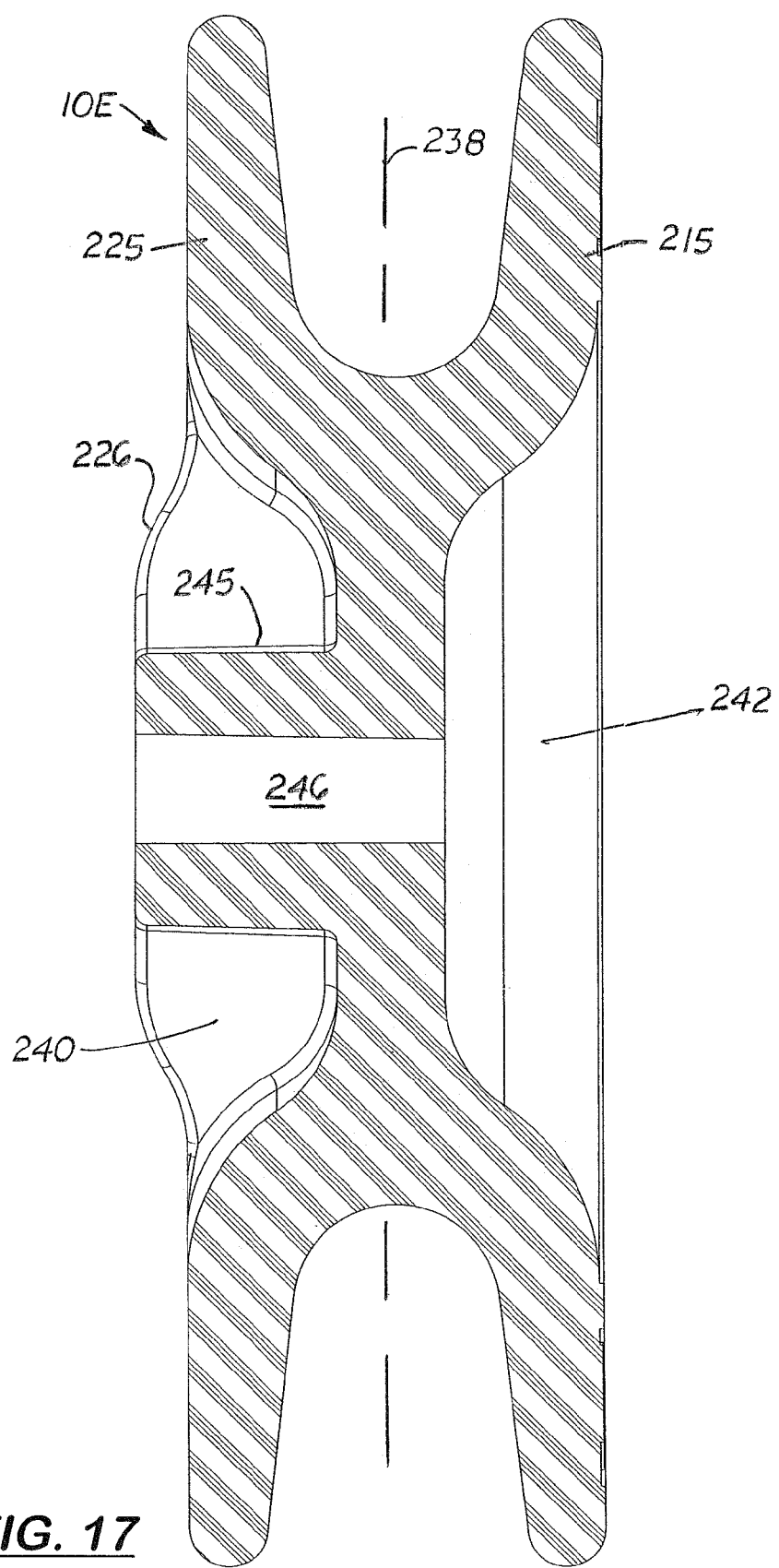
FIG. 17 is a sectional side elevational view of the wheel taken along line 17-17 in FIG. 15.
Figure 18:
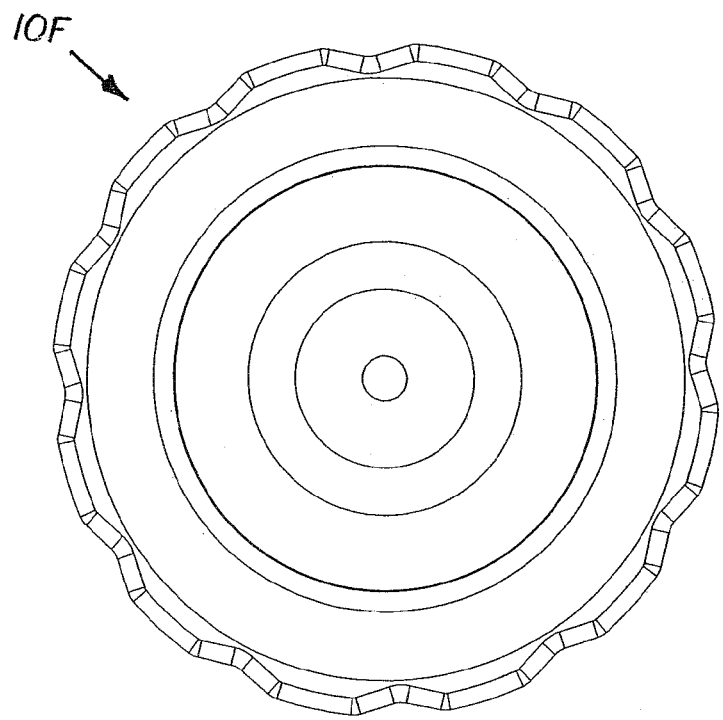
FIG. 18 is a front plan view of a sixth embodiment of the wheel.
Figure 19:
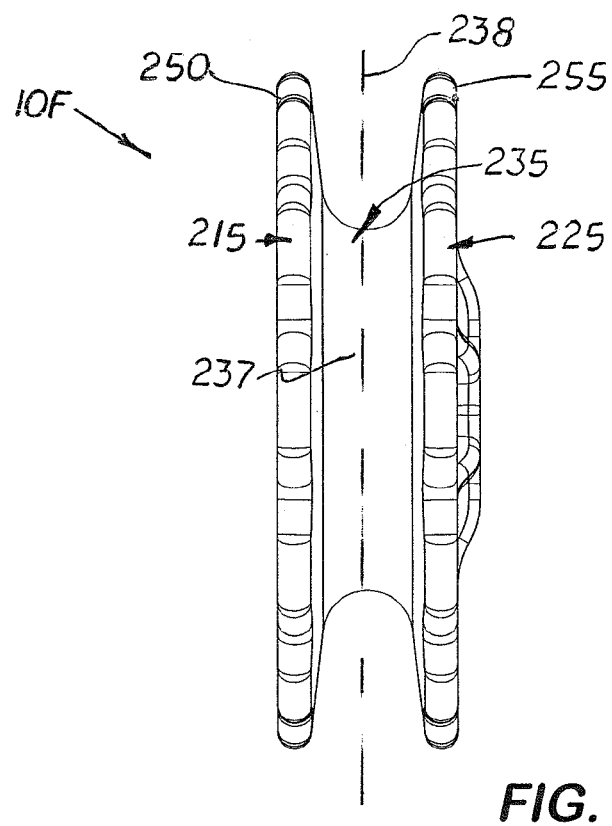
FIG. 19 is a side elevational view of the wheel shown in FIG. 18.

In the accompanying FIGS. 2-19, there is shown a wheel 10 for a piece of lawn equipment, such as the lawn mower 8, (shown in FIG. 1) specifically designed not to produce visible tracks 92, 94 in the lawn 90 as it moves over the lawn 90. FIGS. 2-7 depict a first embodiment of the wheel, generally indicated by reference number 10A that uses two circular discs 15, 25 separated by a center spacer 35. The two discs 15, 25 and the center space 35 are separate components that are connected together with suitable bolts 41. FIG. 8 depicts a second embodiment of the invention, generally indicated by reference number 10B that uses a conical-shaped neck 52 to keep the wheel spaced apart from the lawn mower during use. FIG. 11 depicts a third embodiment of the invention, generally indicated by reference number 10C similar to the first and second embodiments 10A, 10B only with a recessed neck opening 56 formed on the inside surface of the inner disc 25 designed to receive a short neck formed on the lawn mower 9. FIGS. 15-17 show a fourth embodiment of the wheel generally indicated by reference number 10D with two circular discs 215, 225 and a center spacer 242 integrally formed. FIGS. 18-19 show a fifth embodiment of the wheel indicated by reference number 10E similar to the fourth embodiment 10D only with serrated edges on the outer surface of each disc 15, 25.

Figure 3:
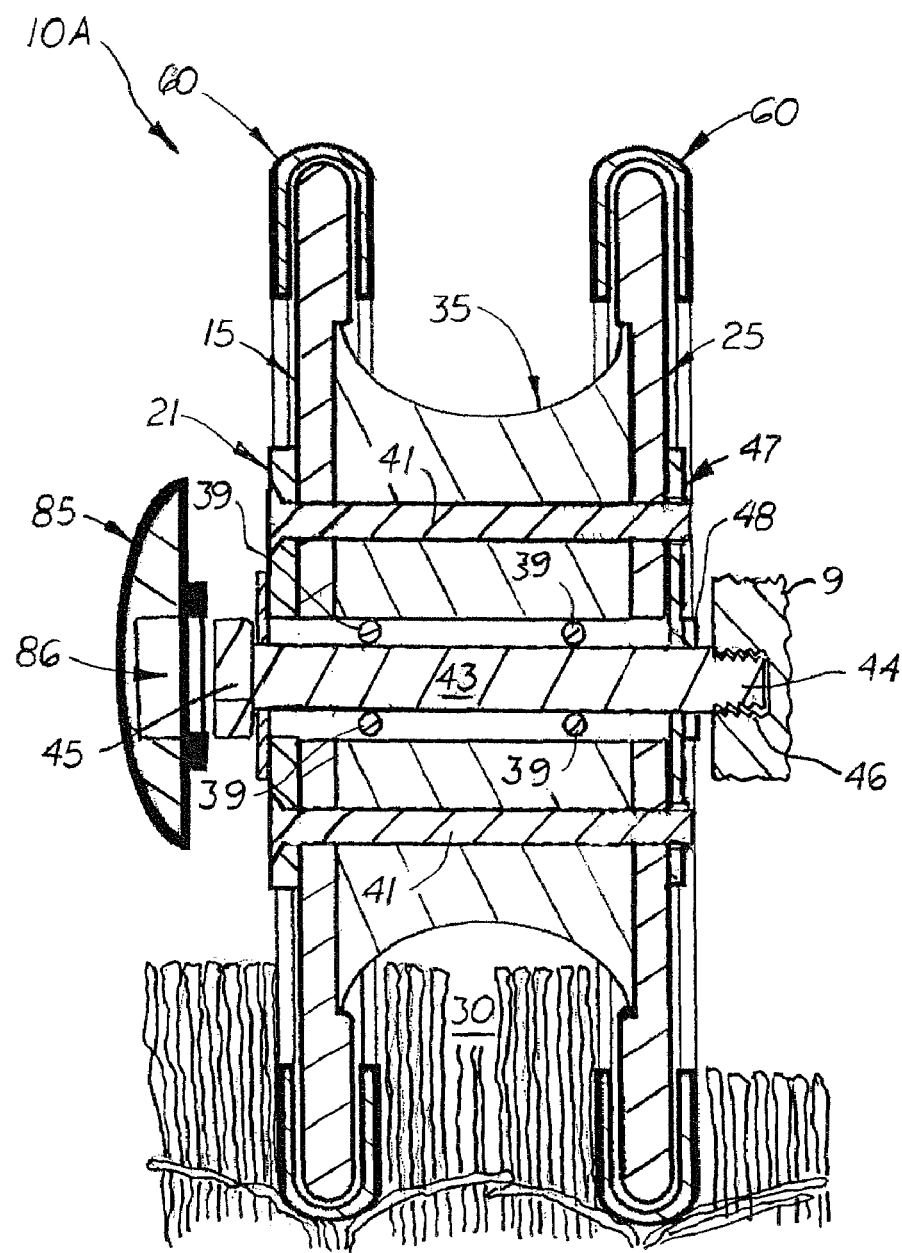
FIG. 3 is a right side elevational view of the first embodiment of the wheel shown in FIG. 2.
Figure 4:
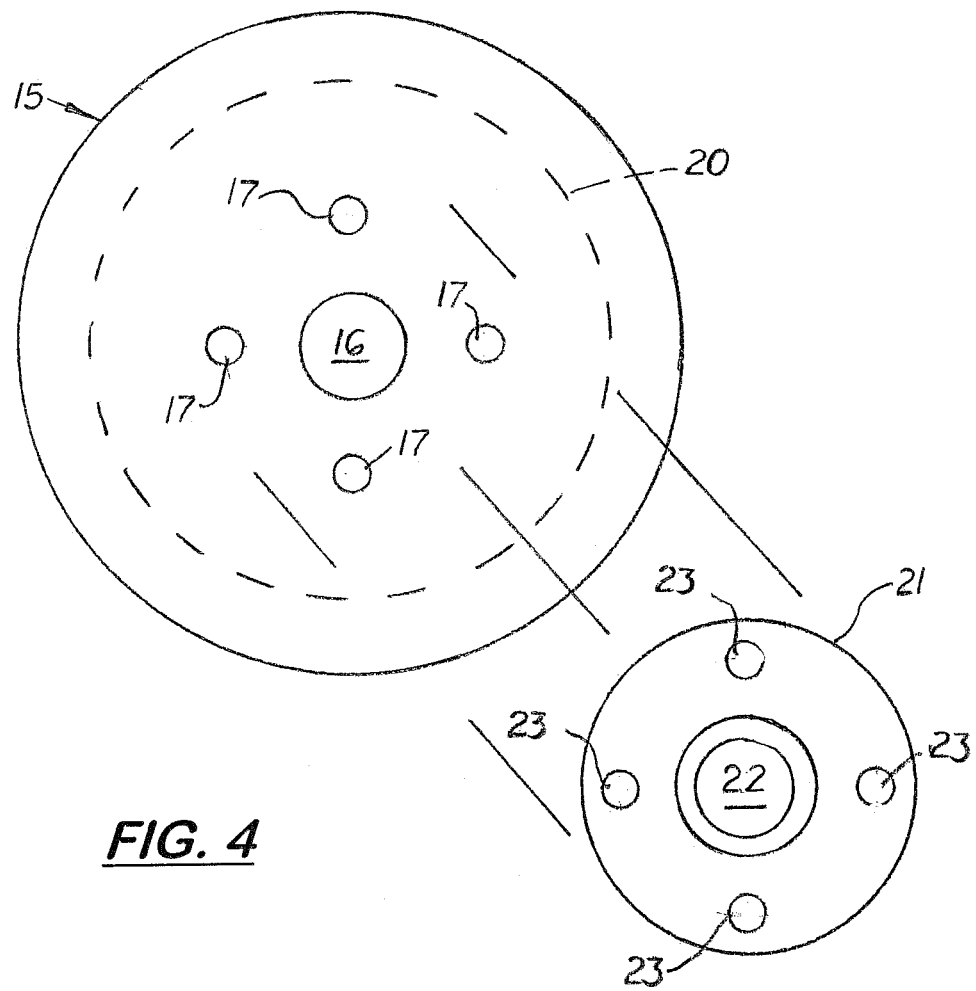
FIG. 4 is a front plan view of the outer disc used on the wheel shown in FIG. 3.

In the first three embodiments, each wheel 10A, 10B, 10C includes two, parallel circular discs 15, 25 spaced apart and selectively connected to the opposite ends of a cylindrical center spacer 35. The two discs 15, 25 are relatively thin and designed to have minimal contact with individual grass blades 91 when rolling over the lawn 90. The diameter of the discs 15, 25 and the center spacer 35 are sufficient so that individual glass blades 91 located between the two discs 15, 25 are not bent downward and extend upward into the space 30 located between the two discs 15, 25 as shown in FIG. 3.

Each disc 15, 25 includes a center bore axle 16, 26 surrounded by four bolt holes 17, 27, respectively. Located on the outer surface of the outer disc 15 is a flat, outer hub plate 21 with a center axle bore 22 that receives an axle bolt 42. Disposed radially around the axle bore 22 are four countersunk holes 23 designed to receive the heads 42 of the four bolts 41 that extend inward into the center spacer 35 and inner disc 25. The distal ends of the bolts 41 are threaded and connect to threaded bores 50 formed on the inner hub plate 47 to hold the wheel together.

Figure 5:
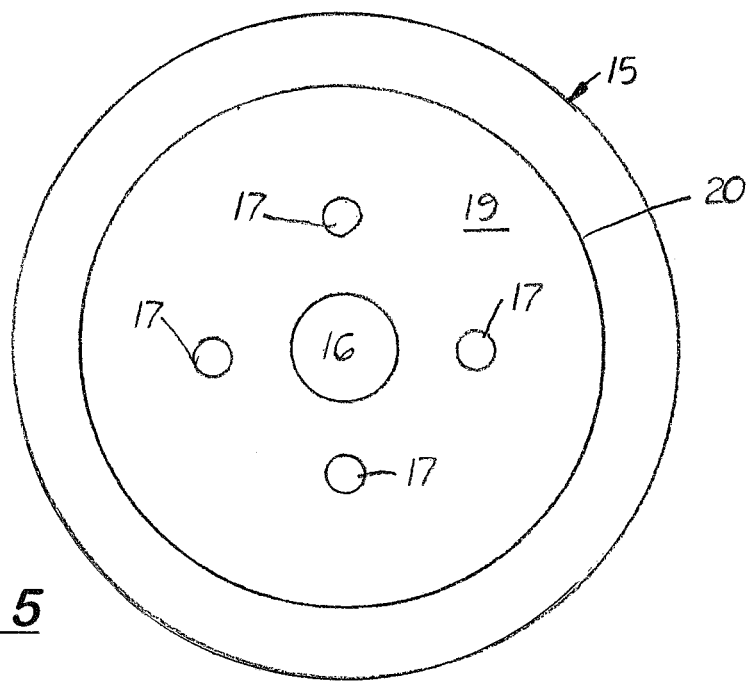
FIG. 5 is a rear plan view of the outer disc on the wheel shown in FIGS. 3 and 4.
Figure 6:
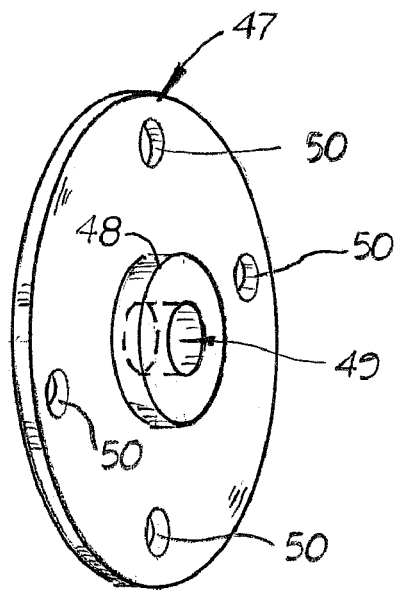
FIG. 6 is a perspective view of the inside hub plate used on the wheel shown in FIG. 3.

FIG. 5 is a rear plan view of the outer disc 15 which shows a recessed, circular lip 20 formed on the inside surface 19 of the disc 15. A similar lip denoted 28 is found on the outside surface of the inner disc 25, (See FIGS. 9 and 10). During assembly, the perimeter edge of the center spacer 35 engages the lips 20, 28 to lock the center spacer 35 in a perpendicularly aligned position between the outer and inner discs 15, 25.

Disposed over the inside surface of the inner disc 25 is an inner hub plate 47. As shown in FIG. 3, the inner hub plate 47 is a flat ring with a perpendicularly aligned neck 48. Formed longitudinally in the neck is an axle bore 49 (Shown more clearly in FIG. 2). Formed radially around the neck 48 are four threaded bores 50 that connect to the threaded ends of the bolts 41. During use, a bolt axle 43 extends through the outer hub plate 21, the outer disc 15, the center spacer 35, the inner disc 25 and the inner hub plate 47. The axle bolt 43 includes threads 44 that connect to a threaded bore 46 on the housing 9 or adjustable bracket 80.

Figure 7:
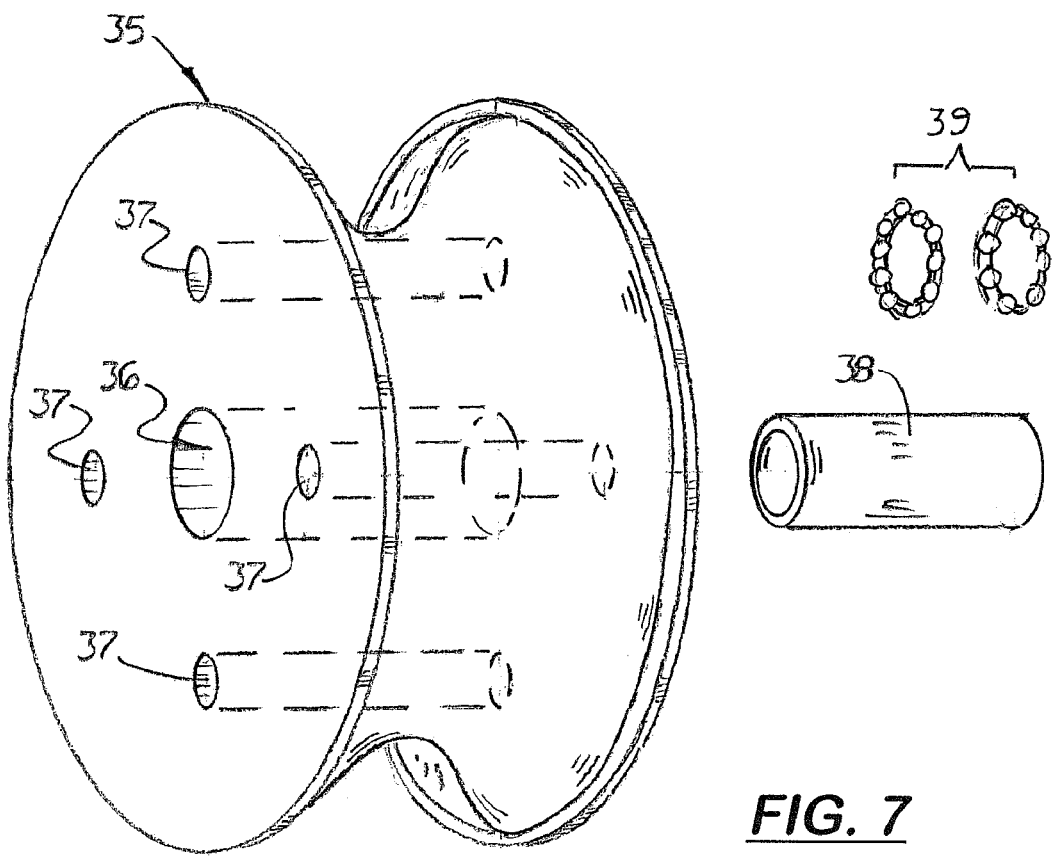
FIG. 7 is a perspective view of the center spacer.
Figure 8:
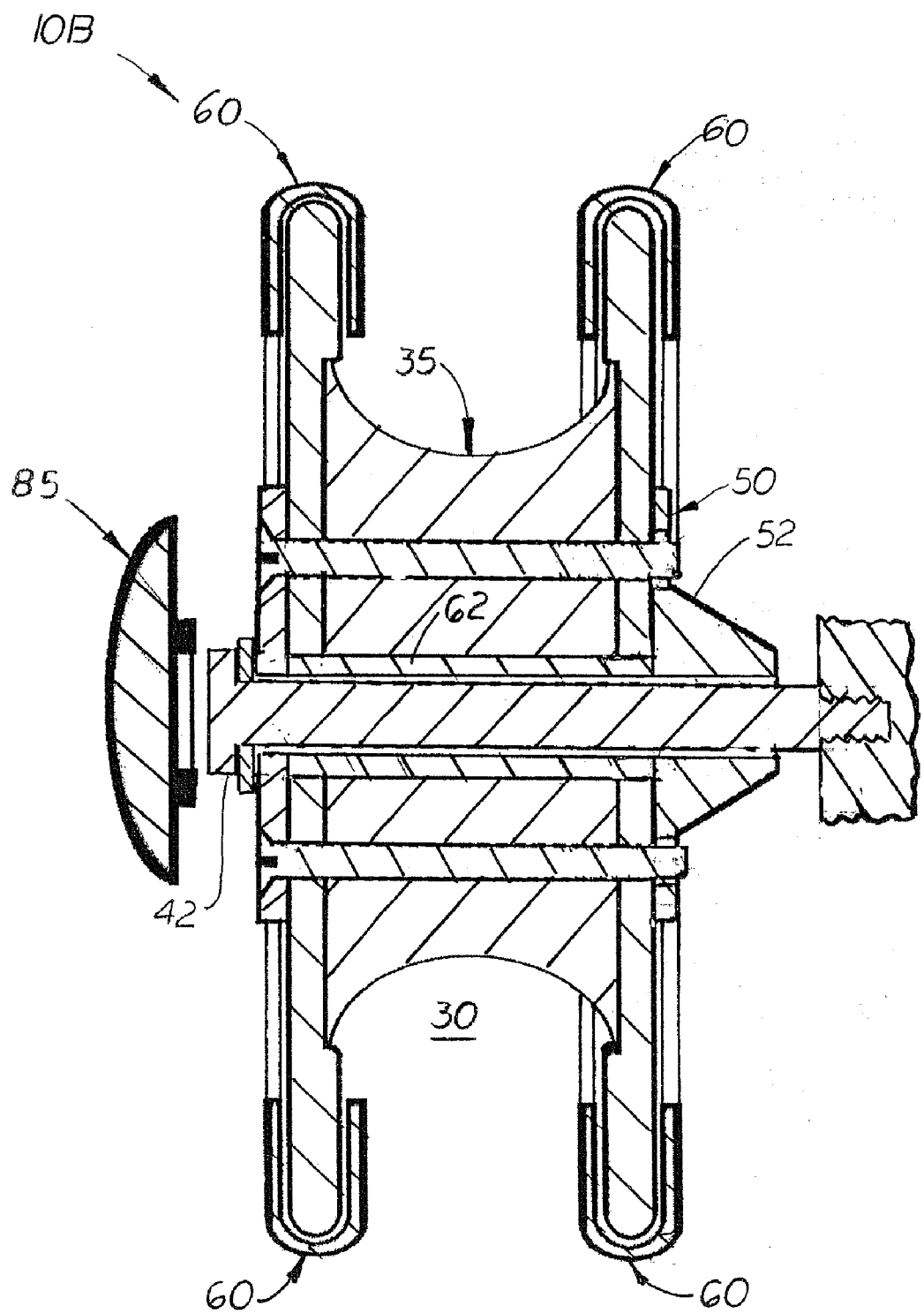
FIG. 8 is a right side elevational view of a second embodiment of the wheel.
Figure 9:
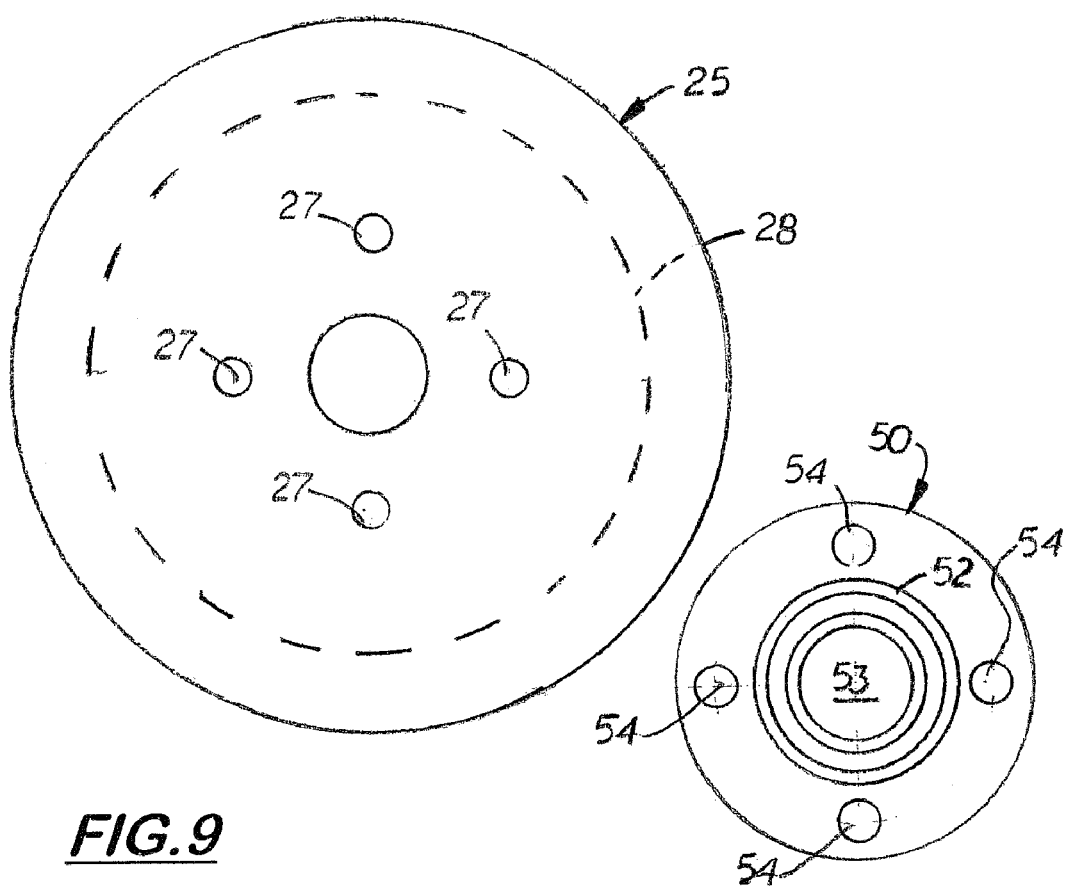
FIG. 9 is a rear plan view of the inner disc used on the wheel shown in FIG. 8.

FIG. 7 shows the center spacer 35 as a cylindrical, hourglass shaped structure that includes a longitudinally aligned center bore 36 designed to receive a cylindrical bushing 38 or two ring bearings 39. Also formed on the center spacer 35 are four, longitudinally aligned bolt passageways 37 designed to receive the four bolts 41. In the preferred embodiment, the concave surface of the center spacer 35 is smooth and designed to gently brush against the tips of the grass blades as the wheel rolls over the lawn. During assembly, the center bore 36 on the center spacer 35 is aligned and registered with the center bores 16, 26 formed on the two discs 15, 25, respectively. The four bolt passageways 37 are aligned and registered with the four bolt holes 17, 27 formed on the two discs 15, 25, respectively. Four bolts 41 are then selected and extended through the two discs 15, 25 and the center spacer 35. During assembly a bushing 38 or two ring bearings 39 if used, are placed inside the center bore 36.

As stated above, three wheel embodiments 10A, 10B, 10C use three different inner hub plates 47, 50, 55, respectfully used on three different lawn mower axle designs commonly used today.

FIG. 8 is a side elevational view of the second embodiment of the wheel 10 B that uses a second hub plate 50 attached to the inside surface of the disc 25. The second hub plate 50 also shown more clearly in FIG. 9, includes a conical-shaped neck 52 that separates the wheel 10B from the housing or bracket than the first hub plate 47 used with the first embodiment 10A. Like the first hub plate 47, the second hub plate 50 includes a center axle bore 53 and four threaded bores 54. FIG. 10 shows the outside surface of the inner disc 25 with the second hub plate 50 coaxially aligned over the outside surface of the inner disc 25.

FIG. 11 shows a third embodiment of the wheel, denoted 10C, designed to connect to an axle bolt 42 that extends laterally from a short neck 71 integrally formed on the lawn mower's outer housing or bracket 9. The wheel 10C uses a third hub plate 55 with a recessed neck opening 56 formed thereon designed to receive the short neck 71 on the housing or bracket 9. The center axle bore 58 formed on the inside disc 25 is slightly larger so that the recessed neck opening 56 formed on the hub plate 55 may partially extend into the inner disc 25. A threaded bore is formed on the short neck 71 that connects to the threads on the axle bolt 42.

Figure 13:
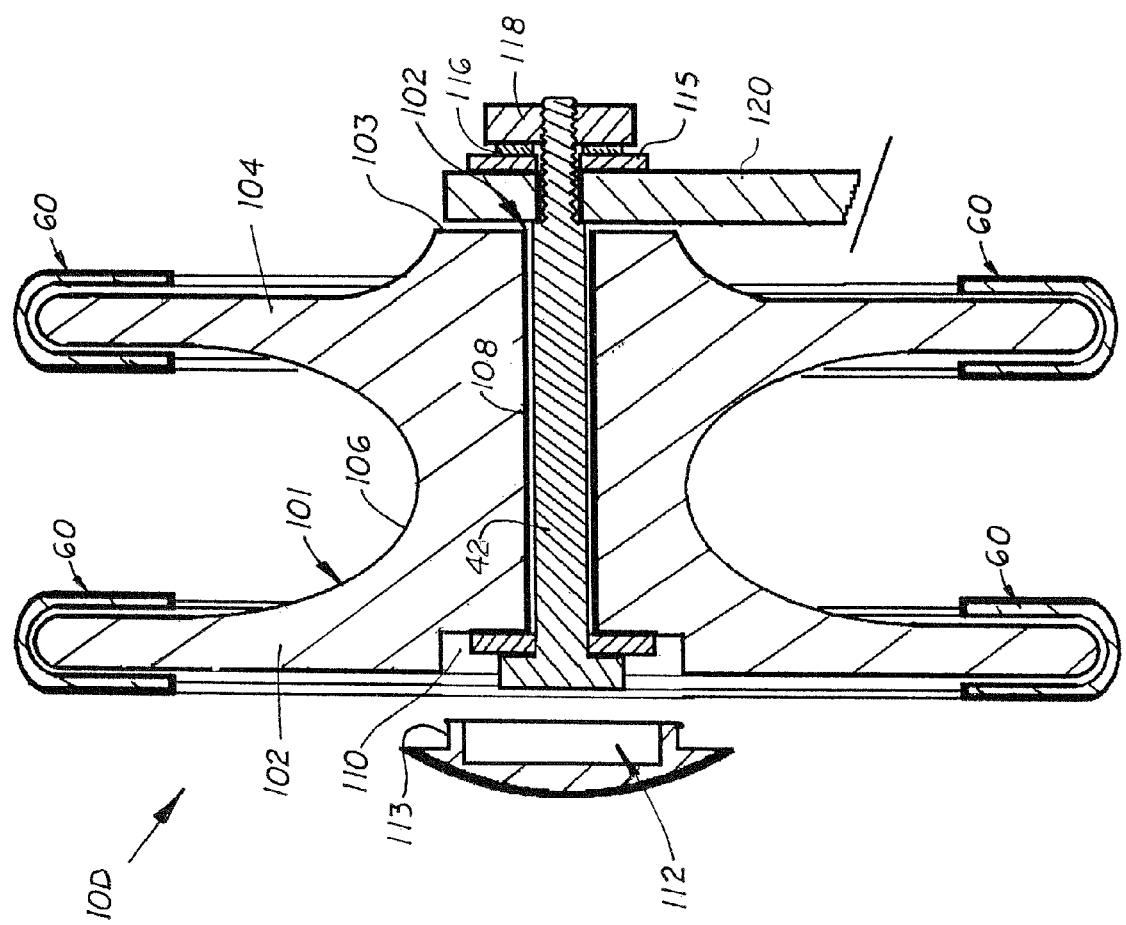
FIG. 13 is a rear plan view of a fourth embodiment of the wheel in which the two discs and center spacer are integrally formed on a single structure.
Figure 14:
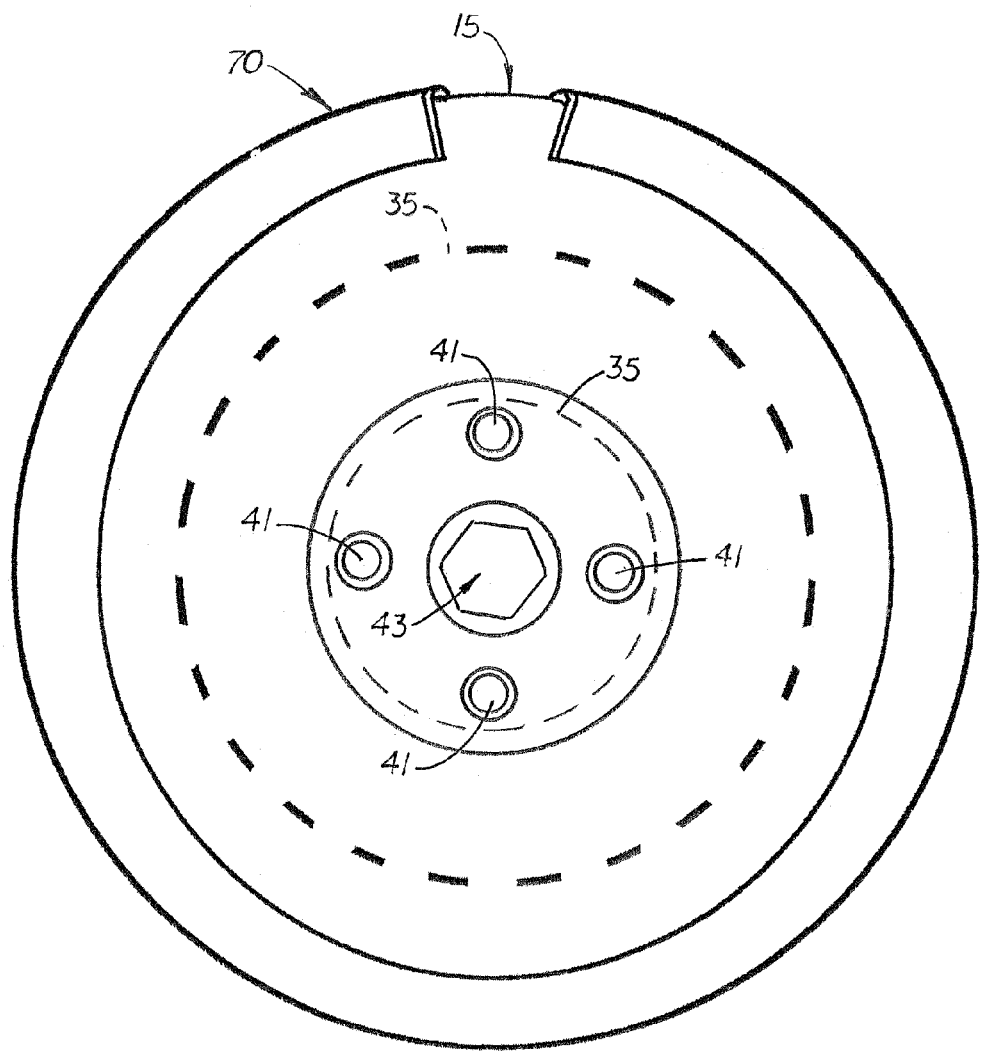
FIG. 14 is a front elevational view of the wheel shown in FIG. 2 with a rubber-like traction ring installed on the perimeter edge.

FIG. 13 depicts a fourth embodiment of the invention generally indicated by the reference number 10D in which the two discs, inner spacer 35, and bushing or bearing are integrally formed in a single structure. Wheel 10D includes a spool body 101 with outer and inner disc flanges 102, 104, respectively, separated by a narrow neck 106. Extended transversely through the spool body 101 is an axle bore 108 designed to receive the axle bolt 42. Formed on the outside surface of the outer disc flange 102 is a circular recessed cap region 110 designed to receive the head of the bolt 42, a washer 46 and the side walls 113 of a removable hubcap 112. The hubcap 112 includes a central cavity 114 designed to receive the head of the axle bolt that extends through the bracket 120. The inside surface 103 of the spool body 101 is flat thereby enabling the wheel 10D to rotate smoothly around the threaded end of bolt 42 and extend through a hole formed on the bracket 120. A standard washer 115, a lock washer 116 and a nut 118 are then attached to the threads on bolt 42.

In the first three embodiments of the wheel, 10A, 10B, 10C, an optional hubcap 85 snap fits over the outer surface of the outer disc 15'. Formed inside the hubcap 85 is a cavity 86 designed to receive the head 43 of the axle bolt 42.

As shown in FIGS. 2, 3, 8, 11, 12 and 13 an optional traction ring 70 made of rubber or similar material is attached the perimeter edge of each disc 15, 25, or disc flange 102, 104 to provide greater traction.

FIGS. 15-17 show a fifth embodiment of the wheel 10E with two, integrally formed outer and inner discs 215, 225 on a centrally located, circular spacer 235. The spacer 235 includes a intermediate section 237 located along the vertical center axis designated 238 on the wheel 10E. Formed on the opposite discs on the wheel 10E are two inner and outer cavities, 240 and 242, respectively. Located centrally in the inner cavity 240 is an inward extending axle neck 245. The circular portion 226 of the inner disc 225 located adjacent to the inner cavity 240 extends inward and acts as a stop surface for the wheel against the lawn mower (not shown). The length of the axle neck 245 is sufficient so that the end of the axle neck 245 is flush or even with the portion 226. Formed inside the axle neck 245 is a passageway 246 designed to receive an axle bolt.

FIGS. 18 and 19 show a sixth embodiment of the wheel, 10F that is structurally identical to the wheel 10E except for serrated circular edges 250, 255, formed along the outer perimeter edges of the inner and outer discs 215, 225, respectfully. In the preferred embodiment, the serrated edges 250, 255 are integrally formed on the discs and provide additional traction when mowing.

The wheels 10A, 10B, 10C, 10D, 10E, and 10F are 4 to 12 inches in diameter. Each disc 15, 25, 215 and 225 and disc flange 102, 104 is 0.25 to 1 inches thick. The center spacer 35, spool body 106, and spacer 235 are 0.75 to 5 inches in length. In the preferred embodiment, the center spacer 35, the spool body 106, and spacer 235 have a diameter of at least one and one-half inches less than the diameter of the disc 15, 25 or disc flange 215, 225. In the third and fourth embodiments of the wheel 10C, 10D, the hubcap recess cavities are 0.25 to 2 inches deep. In each wheel 10A, 10B, 10C, 10D, 10E, and 10F the axle bore is 0.25 to 0.75 inches in diameter. In the preferred embodiment, each wheel 10A, 10B, 10C, 10D, and 10E are made of molded plastic. As noted above, the fourth, fifth and sixth embodiments of the invention are single solid structures and do not require assembly.

Also discussed herein is a method for cutting grass comprising the following steps:

a. selecting a lawn mover that includes at least two axles;

b. selecting two wheels to attach to said axles, each said wheel including two parallel circular discs spaced apart and connected together by a center axle, the height and diameter of said axle being sufficient so that grass blades on a lawn may extend upward and not be bent downward as the lawn equipment moves over the lawn;

c. attaching said wheels to said axles; and, d. moving said lawn mower to cut the grass.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A lawn mower that produces less visible tracks in a lawn, comprising:

a. a lawn mower with at least two laterally extending, non-rotating, fixed axles attached thereto;

b. a track reducing wheel attached to each said fixed axle, each said wheel including two parallel, circular discs having equal diameters and spaced apart and being integrally formed on opposite sides of a center spacer, the height and diameter of each said circular disc and said center spacer being sufficient so that when said wheel is mounted on one of said laterally extending, fixed-axle on said lawn mower and said lawn mower is moved over a lawn, said circular discs support said lawn mower over the lawn, and individual grass blades located below said center spacer may extend upward and are not bent downward thereby reducing the visibility of tracks in the lawn, each said wheel includes an inner cavity located on one said circular disc and an outer cavity formed on the other said circular disc, said wheel also includes an axially extending axle neck formed on said center spacer with a transversely aligned axle bore formed therein, each said wheel further includes a center, axially extending portion formed on one said circular disc and adjacent to said inner cavity, said extending portion and said axle neck being even thereby creating a stop surface for said wheel against the lawn mower.

2. The lawn mower, as recited in claim 1, wherein said wheels are made of molded plastic.

3. A method for cutting grass with a lawn mower with at least two laterally extending, non-rotating, fixed axles so that the tracks produced by wheels mounted on the axles are less visible, said method; consisting of the following steps:

a. selecting a lawn mower that includes at least two laterally extending, fixed axles attached thereto;

b. selecting two wheels to be attached to said axles, each said wheel including two parallel, equal diameter, circular discs, axially spaced apart and integrally formed on a smaller diameter center spacer, the diameters of said circular discs and said center spacer being sufficient so that the lawn mower is supported on a lawn by said circular discs and grass blades on the lawn may extend upward into the space formed between said circular discs and not be bent downward as the lawn mower moves over the lawn; each said wheel includes an inner cavity located on one said circular disc and an outer cavity formed on the other said circular disc, said wheel also includes an axially extending axle neck formed on said center spacer with a transversely aligned axle bore formed therein, each said wheel further includes a center, axially extending portion formed on one said circular disc and adjacent to said inner cavity, said extending portion and said axle neck being even thereby creating a stop surface for said wheel against the lawn mower;

c. attaching said wheels to said axles on the lawn mower;

d. positioning the lawn mower in an upright position on a lawn so that said wheels support said the lawn mower in a cutting position; and, e. operating and moving the lawn mower over the lawn to cut the grass blades.

\* \* \* \* \*